United States Patent [19]
Buchan

[11] Patent Number: 6,123,842
[45] Date of Patent: Sep. 26, 2000

[54] DISPENSING OF WATER TREATMENT SUBSTANCES

[75] Inventor: Leon Buchan, District Brits, South Africa

[73] Assignee: Control Chemicals (Proprietary) Limited, Johannesburg, South Africa

[21] Appl. No.: 09/138,706

[22] Filed: Aug. 24, 1998

[30] Foreign Application Priority Data

Aug. 22, 1997 [ZA] South Africa ............................ 97/7576

[51] Int. Cl.$^7$ ..................................................... B01D 11/02
[52] U.S. Cl. ...................... 210/169; 210/242.1; 210/205; 210/236; 422/265; 222/168
[58] Field of Search ................................ 210/169, 242.1, 210/198.1, 205, 240, 232, 235, 236; 422/265; 222/168

[56] References Cited

U.S. PATENT DOCUMENTS

| | | | |
|---|---|---|---|
| 3,846,078 | 11/1974 | Brett ...................................... | 210/242.1 |
| 4,630,634 | 12/1986 | Sasaki et al. ............................ | 422/265 |
| 4,798,707 | 1/1989 | Thomas et al. .......................... | 210/169 |
| 4,917,868 | 4/1990 | Alexander et al. .................. | 210/242.1 |
| 5,055,183 | 10/1991 | Buchan .................................... | 210/205 |

*Primary Examiner*—David A. Simmons
*Assistant Examiner*—Frank M. Lawrence
*Attorney, Agent, or Firm*—James Ray & Associates

[57] ABSTRACT

The present invention provides a dispenser for dispensing a water treatment substance into water. The dispenser contains a holder for holding a supply of a solid water dispersable water treatment substance. The holder has at least one primary water opening through which untreated water can enter the holder and treated water, containing water treatment substance dispersed therein, can exit the holder or be dispensed from the holder. A component is attached to the holder and has a secondary opening which is spaced from the primary opening and through which untreated and treated water can pass. An enclosed water flow path is defined between the primary opening and the secondary openings.

12 Claims, 7 Drawing Sheets

DISPENSING OF WATER TREATMENT SUBSTANCES

FIELD OF THE INVENTION

The present invention relates, in general, to the dispensing of water treatment substances and, in particular, to a dispenser for dispensing a water treatment substance into water.

SUMMARY OF THE INVENTION

The present invention provides a dispenser for dispensing a water treatment substance into water, such dispenser comprises a holder for holding a supply of such solid water dispersable water treatment substance and has at least one primary water opening through which untreated water can enter the holder and treated water, containing such water treatment substance disbursed therein, can exit the holder or be dispensed from such holder. There is further a component attached to the holder which has a secondary opening which is spaced from such primary opening and through which untreated and treated water can pass, with an enclosed water flow path being defined between the primary and secondary openings. Such length of the water flow path may be adjustable.

In another embodiment of the invention the holder may further include a cylindrical holder wall having first and second ends, with at least the first end being closed off and with the primary opening being located in the holder wall in proximity to its first end. The second end of the holder may also be closed off. The closing off of the ends of the holder wall may be by means of end pieces or caps. The component may comprise an end cap over the first end of the holder wall. The end cap may comprise a circular end piece or base and a skirt protruding from the end piece, with the secondary opening being provided in the skirt. The end cap may be rotatable relative to the holder wall, thereby to provide the adjustability of the length of the water flow path. A pair of secondary openings may be provided in the skirt, and they may be spaced diametrically apart. Similarly, a pair of the primary openings may be provided in the holder wall, and they may also be spaced diametrically apart. The secondary openings or apertures may be located the same distance from the first end of the holder as the primary openings or apertures. The skirt may be spaced with some clearance from the wall of the holder, but is arranged such that water can only enter and exit the space between the space between the skirt and the holder wall through the apertures. Thus, the length of the water flow path is adjusted by rotating the component relative to the holder. For example, the component can be rotated from a position in which the primary and secondary apertures are aligned with each other and wherein the water flow path is the shortest, so that maximum dosage of the substance is achieved, to a position in which the primary and secondary apertures are 90° apart and wherein the water flow path is the longest, so that the minimum dosage of the substance is achieved.

In another embodiment of the invention, the dispenser may include a second skirt between the holder wall and the skirt of the end cap such that it, i.e. the second skirt, is spaced from the holder wall as well as from the skirt of the end cap, with at least one tertiary water opening or aperture being provided in the second skirt and with the second skirt being fixed in position relative to the holder wall such that the tertiary opening is staggered relative to the primary openings. A pair of tertiary openings, spaced diametrically apart, may be provided in the second skirt.

In still another embodiment of the invention, the dispenser may include a second skirt around the skirt of the end cap such that it is spaced from the skirt of the end cap, with at least one tertiary water opening being provided in the second skirt and with the second skirt being fixed in position relative to the holder wall. As described hereinbefore, a pair of the tertiary water openings, spaced diametrically apart, may be provided in the second skirt. The second skirt may be peripherally attached to the holder near its first end so that an annular gap is defined between the skirt and the first end portion of the holder. The skirt of the end cap thus constitutes a baffle separating the annular gap into a first annular gap portion adjacent the holder wall, and a second annular gap portion adjacent the second skirt, with the distal end of the skirt of the end cap located more-or-less sealingly against the primary skirt. The end cap may also include a third skirt protruding from the base and attached sealingly yet rotatably to the second skirt. In particular, the primary and tertiary apertures can, in this embodiment of the invention, be aligned radially with one another. Thus, the end cap or component can be rotated from a position in which the secondary apertures are aligned with the primary and tertiary apertures and in which the water flow path is a minimum length and dosage of the substance at a maximum to a position in which the secondary apertures are spaced 90° from the primary and tertiary apertures and in which the water flow path is a maximum length with dosage of the substance being at a minimum.

OBJECTS OF THE INVENTION

It is, therefore, one of the primary objects of the present invention to provide a dispenser for dispensing a water treatment substance into water wherein the dispenser holds a supply of a solid water treatment substance.

Another object of the present invention is to provide a dispenser for dispensing a water treatment substance into water wherein primary and secondary openings are provided for passing treated and untreated water.

Yet another object of the present invention is to provide a dispenser for dispensing a water treatment substance into water wherein a holder may have a cylindrical wall having end caps on such ends of the wall.

Still another object of the present invention is to provide a dispenser for dispensing a water treatment substance into water wherein openings are provided in a skirt around end caps.

An additional object of the present invention is to provide a dispenser for dispensing a water treatment substance into water wherein an accurate dosage may be dispensed.

In addition to the numerous objects and advantages of the present invention described above, various other objects and advantages of the dispenser will become even more readily apparent to those persons who are specifically skilled in the relative art from the following more detailed description of the instant invention, particularly, when such description is taken in conjunction with the attached drawing Figures and with the appended claims.

Figure 1:
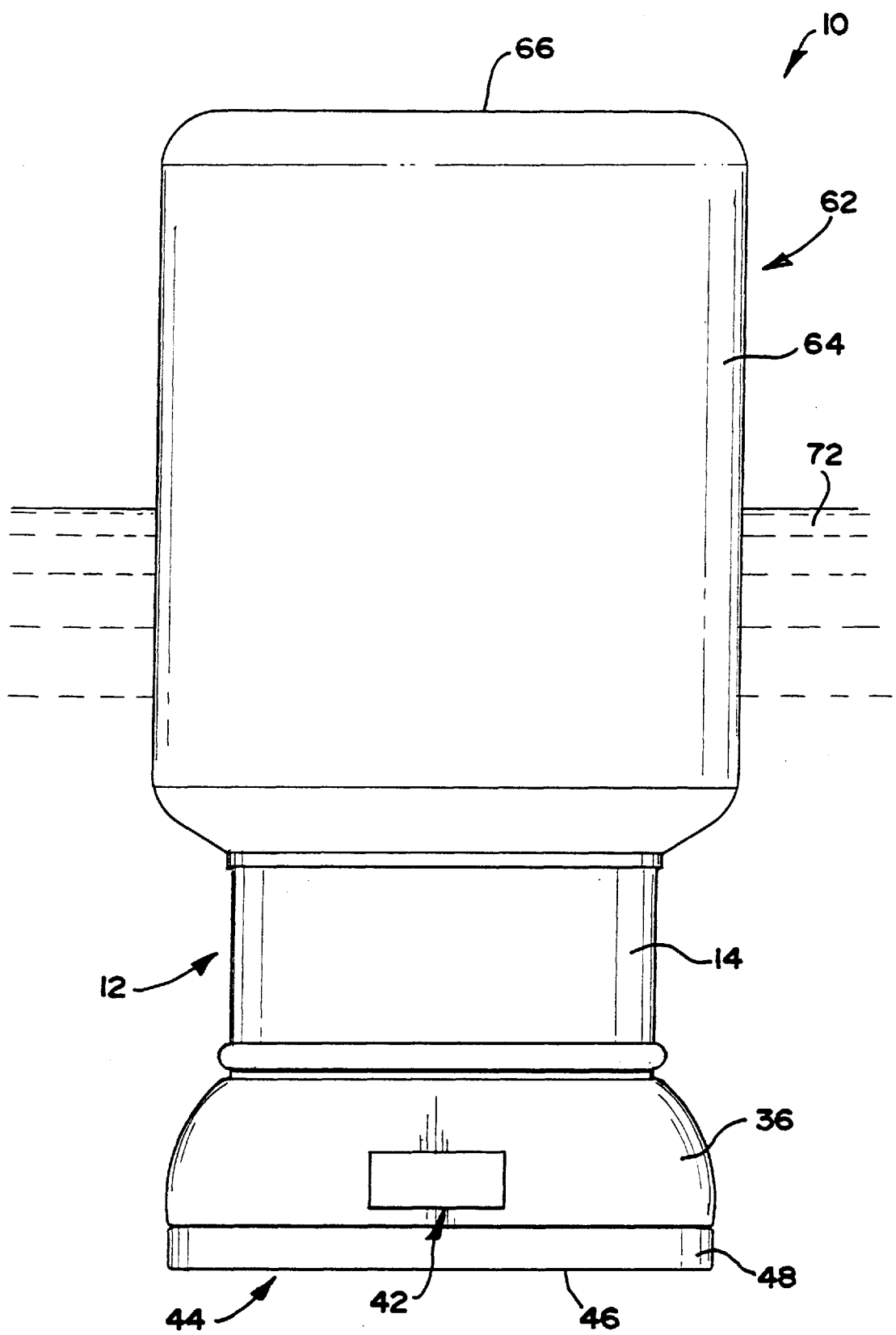
FIG. 1 shows a side view of a dispenser according to a first embodiment of the invention.
Figure 2:
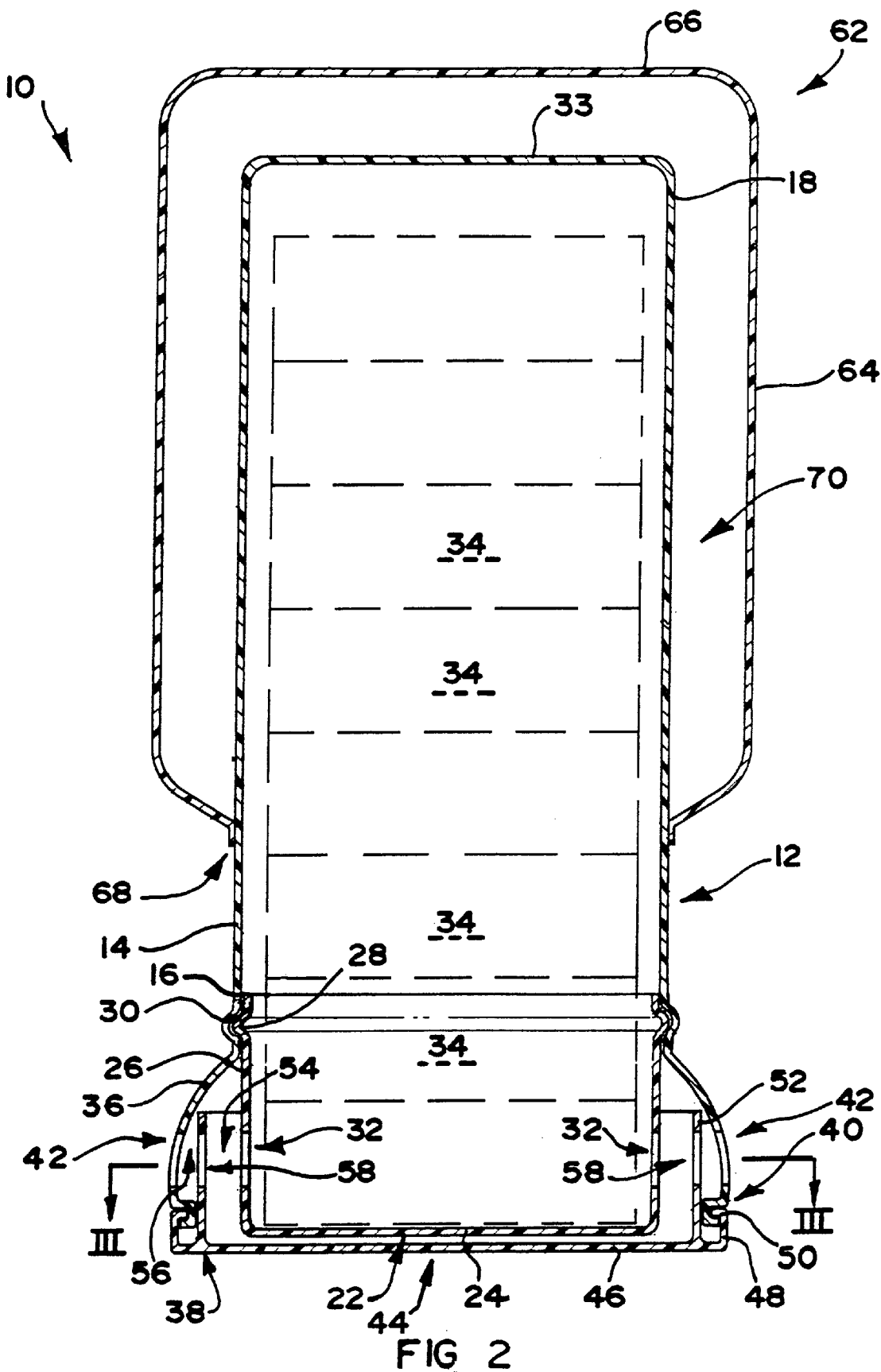
FIG. 2 shows a longitudinal sectional view through the dispenser of FIG. 1.

BRIEF DESCRIPTION OF THE PRESENTLY PREFERRED AND VARIOUS ALTERNATE EMBODIMENTS OF THE INVENTION

Prior to proceding to the much more detailed description of the present invention, it should be noted that, for the sake of clarity and understanding of the invention, identical components which have identical functions have been designated with identical reference numerals throughout the several views illustrated in the drawing Figures.

Reference is now made, more specifically, to FIGS. 1–4. Illustrated therein is a dispenser, generally designated 10, according to a first embodiment of the invention. Dispenser 10 includes a holder, generally indicated by reference numeral 12. The holder 12 comprises a cylindrical plastics holder wall 14 having a first end portion 16 and a second end portion 18. Into the first end portion 16 of the wall 14 protrudes a plastics cup 22 comprising an end disc 24 and a skirt 26 protruding peripherally from the disc 24. In proximity to its free end, the skirt 26 is provided with a radially outwardly protruding rib 28, which is located in a circumferential recess 30 within the wall 14 in proximity to its first end 16, thereby to retain the cup 22 in position.

In the skirt 26 are provided two diametrically opposed rectangular primary apertures 32. Each aperture is about 15 mm×7.5 mm, (i.e. about 112 mm$^2$), and is thus of a sufficient size to prevent clogging thereof in use. The second end 18 of the holder 12 is closed off with an end piece 33.

Inside the holder are located a plurality of water treatment tablets 34. The tablets 34 are stacked one above the other. Each tablet comprises a water dispersable or water soluble water treatment substance. Thus, the tablets may comprise, by mass, 94% calcium hypochlorite, 5% chloride of lime, and 1% zinc stearate as tabletting lubricant. Thus, the tablets have a composition as described in South African Patent No. 77/0938 which is hence incorporated herein by reference.

The dispenser 10 includes a circumferential skirt 36 flaring radially outwardly from the first end portion 16 of holder wall 14, such that an annular gap 38 is defined between the skirt 36 and the skirt 26 of the cup 22. A peripherally inwardly protruding circumferential groove 40 is provided on the outside of skirt 36.

A pair of diametrically opposed secondary apertures 42 are provided in the skirt 36. The apertures 42 are aligned with the apertures 32, and are of the same size, i.e. about 15 xmm×7.5 mm.

The dispenser 10 includes a component, generally indicated by reference numeral 44. The component 44 comprises a disc-like base 46 from which protrudes a circumferential skirt 48, with skirt 48 having an inwardly protruding circumferential 50 which engages the groove or recess 40 in the skirt 36. In this fashion, the component 44 is attached sealingly yet rotatable to the skirt 36.

The component 44 also includes a skirt 52 located inwardly of the skirt 48, with the height of the skirt 52 being such that its distal end abuts against the inside of the skirt 36. Thus, the skirt 52 serves to divide the annular gap 38 into a first annular gap portion 54 adjacent the skirt 26, and a second annular gap portion 56 adjacent the skirt 36. In the skirt 52 are provided diametrically opposed apertures 58 which are similar in size to the apertures 32, 42,(e.g. about 15 mm×7.5 mm). Apertures 58 are also diametrically opposed and are located the same distance from the end disc 24 as the apertures 32, 42.

Figure 3:
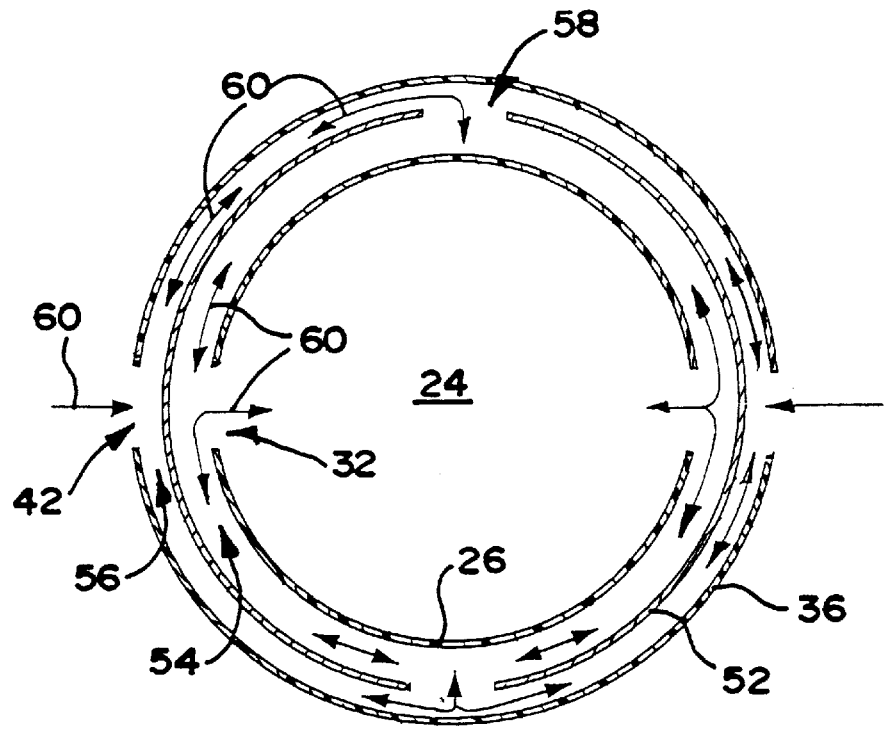
FIG. 3 shows a sectional view through III—III in FIG. 2, with the component of the dispenser in a first position, and with some details omitted for clarity.
Figure 4:
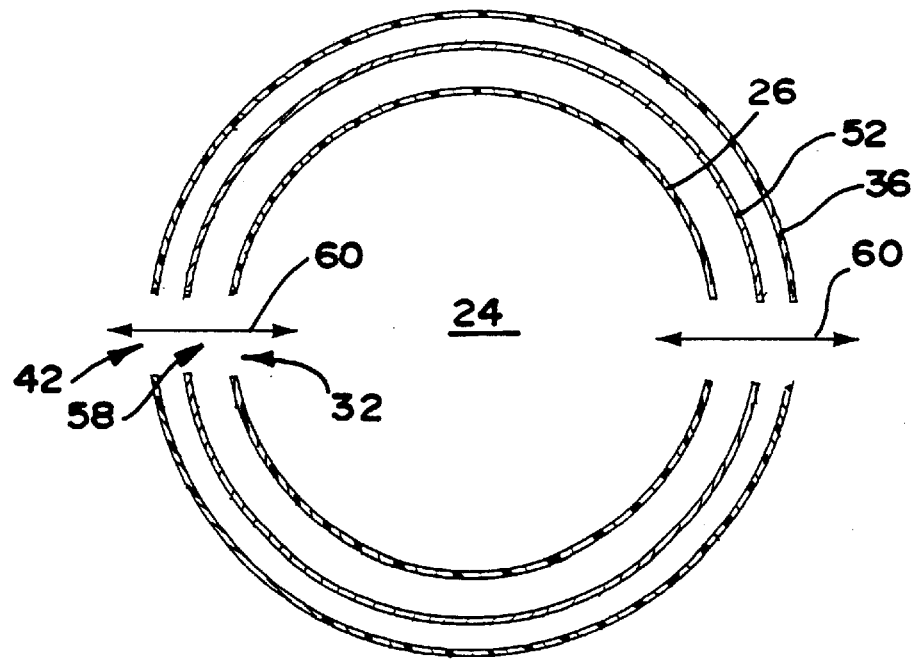
FIG. 4 shows a sectional view similar to that of FIG. 3, with the component in a second position.
Figure 5:
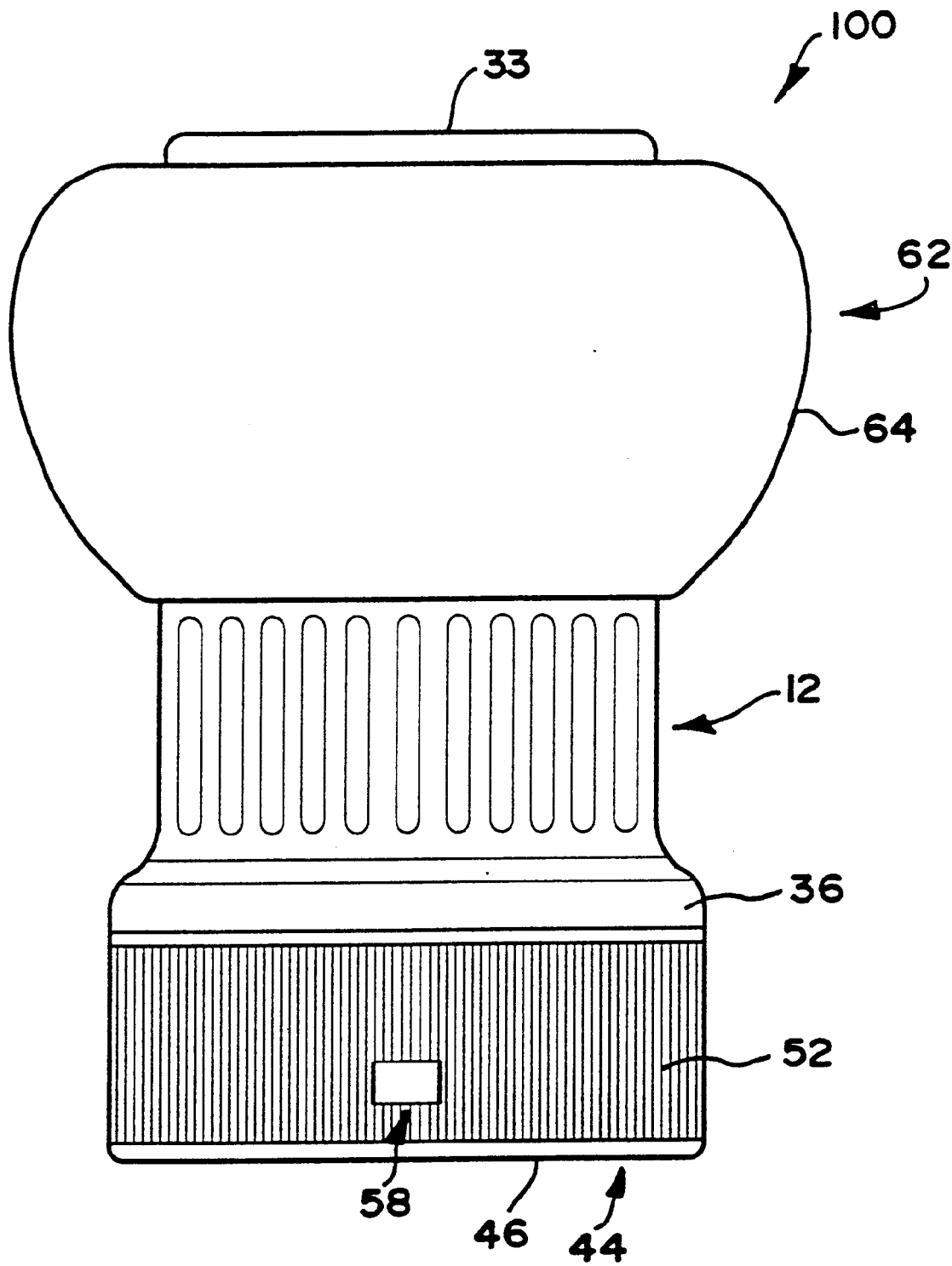
FIG. 5 shows a side view of a dispenser according to a second embodiment of the invention.
Figure 6:
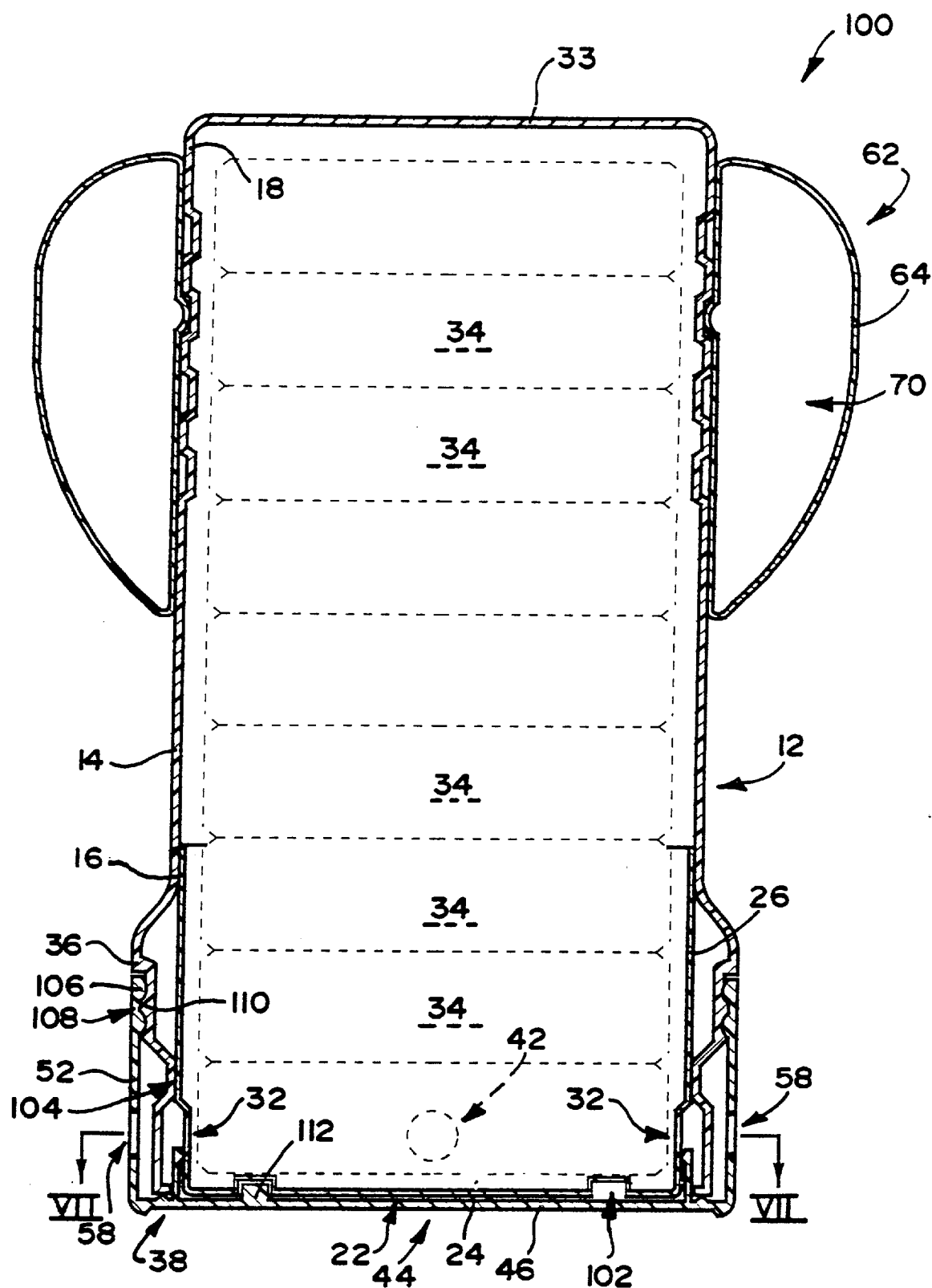
FIG. 6 shows a longitudinal sectional view of the dispenser of FIG. 5.

Thus, an enclosed water flow path, as indicated by arrows 60 in FIGS. 3 and 4, is defined from each of the apertures 42 along the second gap portion 56, through one of the apertures 58, along the first gap portion 54 through one of the apertures 32, as indicated most clearly in FIGS. 3 and 4. By rotating the component 44, the position of the apertures 58 can be varied from that indicated in FIG. 3, where the length of the flow path is at a maximum and the degree of water dosage at a minimum, to the position indicated in FIG. 4, where all the apertures are aligned and wherein the water flow path is at its shortest. This corresponds to a position of maximum dosage of water treatment substance into water in which the dispenser 10 is located.

The dispenser 10 also includes an outer body 62 having a square or cylindrical wall 54, a closed end 66 and an open end 68. The holder 12 fits snugly into the open end 68 such that the second end 18 of the holder 12 abuts against the closed end 66 of the outer body 62. A buoyancy chamber 70 is thus defined by the outer body 62 around the holder 12. The fact that the holder 12 extends up to the end 66 of the outer body 62 serves to stabilize the dispenser 10 and assist in the stabilizer floating stably and uprightly in water, without the need to provide, in the holder 12, a further aperture spaced above,(i.e. at a higher operative level than), the apertures 32, 42. If desired, a suitable clipping means, e.g. a circumferential rib and groove arrangement, (not shown) may be provided on the holder wall 14 and the outer body 62 to hold them in position relative to each other.

In use, the dispenser 10 is allowed to float in a body of water 72 to be treated with the water treatment substance of the tablets 34. Typically, such a body of water can be a swimming pool. The degree of dosage of the substance into the water can be adjusted by rotating the component 44 so that its apertures 58 are in the position indicated in FIG. 4, if maximum dosage is required, or in the position indicated in FIG. 3, if a minimum dosage level is required, or at any position in between, with such position thus corresponding to a dosage rate between the maximum and minimum.

The Applicant believes that, with the dispenser 10, accurate dosage can be achieved. Additionally, the dosage rate is infinitely variable, and the apertures 32, 42 and 58 will not be prone to clogging due to the size thereof. However, in spite of the size of the apertures 32, 42 and 58, accurate dosage is still achieved by virtue of the component 44 providing water pathway 60.

The various components of the dispenser 10 may be blow or injection molded, e.g. from polyethylene or the like.

Typically, the diameter of the skirt 36 may be about 106 mm, the diameter of the skirt 52 about 98 mm and the diameter of the skirt 26 about 82 mm.

In another embodiment of the invention, the skirt or baffle 52 may be attached to the base 46, i.e. not molded integrally therewith.

Referring to FIGS. 5 to 8, reference numeral 100 generally indicates a dispenser according to a second embodiment of the invention. Parts of the dispenser 100 which are the same or similar to those of the dispenser 10 hereinbefore described with reference to FIGS. 1 to 4, are indicated with the same reference numerals.

The holder 12 of the dispenser 100 is similar to that of the dispenser 10, save that the skirt 26 of the plastics cup 22 is merely located frictionally within the end portion 16 of the holder wall 14, and not by means of the rib 28 and the recess 30. Additionally, an annular recess 102 is provided in the end piece or disc 24.

The skirt 36 of the dispenser 100 differs from that of the dispenser 10, in that the skirt 36, in the case of dispenser 100, is shaped to have a portion 104 which abuts against the skirt 26. Additionally, the skirt 36 is located between the skirt 26 and the skirt 52. The skirt 36 is thus fixed in position relative to the skirt 26, and its apertures 42 are staggered 900 relative to the apertures 32 in the skirt 26.

The skirt 52 of the component 44 of the dispenser 100 is spaced with annular clearance from the skirt 36, and its upper end portion 106 fits snugly within a recess in the skirt 36 and has a circumferential recess 108 which engages a complementary circumferentially extending protruding clip formation 110 on the skirt 36 thereby attaching the component 44 securely yet rotatable to the skirt 36.

A locating pin 112 protrudes upwardly from the base 46 and is located in the recess 102 in the disc 24.

The buoyant body 62 of the dispenser 100 is of cylindrical form, and fits around the upper end portion of the holder 12, having a circumferential recess which engages a circumferential groove in the vessel 12.

Figure 8:
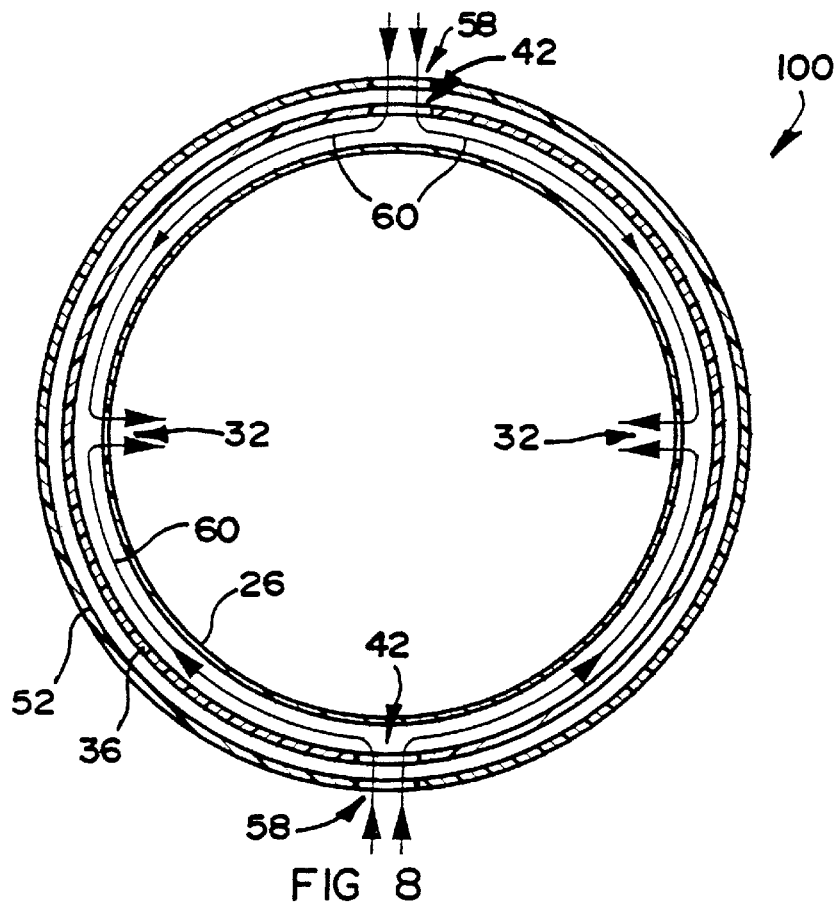
FIG. 8 shows a sectional view similar to that of FIG. 7, with the component in a second position.
Figure 7:
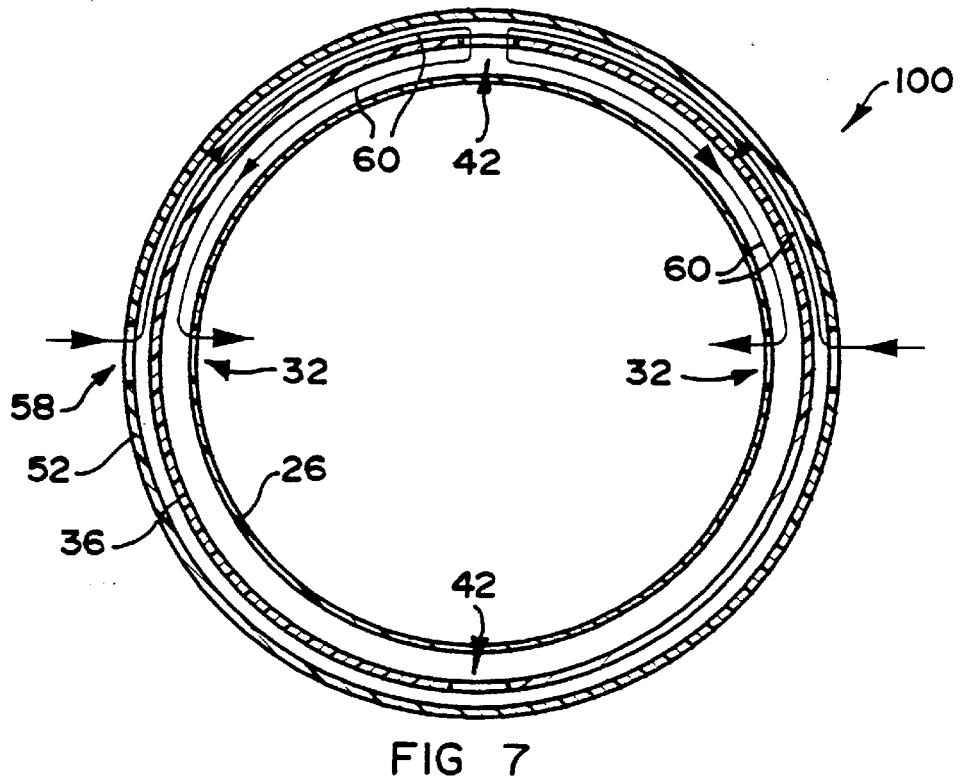
FIG. 7 shows a sectional view through VII—VII in FIG. 6, with the component in a first position.

In use, the component 44 can be rotated from a position as indicated in FIG. 8, in which the length of the flow path 60 is at a minimum and hence the dosage of the water at a maximum, to the position indicated in FIG. 7, in which the length of the flow path 60 is at its maximum, with the dosage of the water treatment substance being at a minimum.

Since there is no upper opening in the wall 14 of the holder 12, the water level inside the holder 12, in use, is determined by the hydrostatic pressure inside the holder 12 and is typically located at about the level of the second tablet 34, when counted from the operatively lower end of the holder 12.

If necessary, a plug or spacer (not shown) of suitable buoyant material, such as polystyrene, can be located between the uppermost tablet 34 and the end piece 33 of the vessel 12.

If desired, vertical baffles can be provided between the skirts 26, 36 and 36, 52 with the vertical baffles then being, in the case where they are located between the skirts 26, 36, attached to the skirt 26 or the skirt 36, and in the case where they are located in the gap between the skirts 36, 52, being attached to the skirt 36 and/or to the skirt 52.

Figure 9:
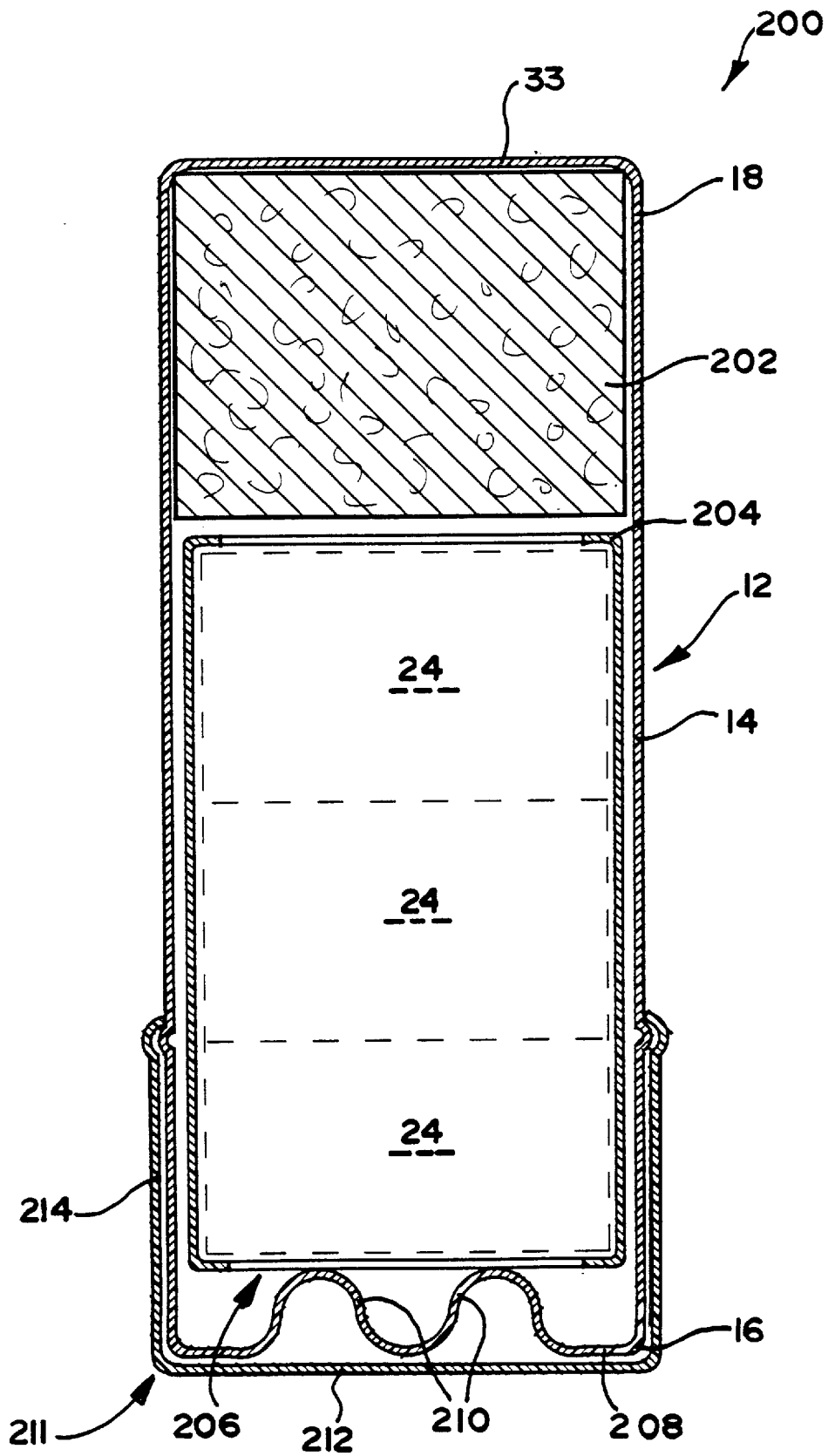
FIG. 9 shows a longitudinal sectional view of a dispenser according to a third embodiment of the invention.

Referring to FIG. 9, reference numeral 200 generally indicates a dispenser according to another embodiment of the invention.

Parts of the dispenser 200 which are the same or similar to those of the dispenser 10 and 100 hereinbefore described with reference to FIGS. 1 to 8, are indicated with the same reference numerals.

In the dispenser 200, a separate outer body 62 is not provided. Instead, in the upper end of the holder 12 is located a polystyrene filler 202 which provides the necessary buoyancy.

Still further, in the holder 200, the tablets 24 are not merely stacked one above the other, but contained within a PVC wrapper 204. Thus, the tablets are in the form of part of a device as described in South African Patent No. 94/6677 which is hence incorporated herein by reference. The PVC wrapper has openings 206 at its ends so that the tablets are exposed at the ends.

In this case, the wall 14 of the holder is integral, i.e. the end cap 22 is dispensed with and the first end of the wall 14 is closed off with an integral end piece 208. A plurality of ridges or protrusions 210 are provided in or on the end piece 208 so that the bottommost tablet is spaced with clearance from the end piece 208. The ope ning at the lower end of the shrink wrapped device or package thus constitutes the opening through which the tablets are contacted with water. Th e primary apertures (not shown) are thus provided in the wall 14 in proximity to its lower end 16.

The holder 200 includes a cup-like component 211 having a disc-like base 212 and a circumferential skirt 214 protruding upwardly from the base, and provided with the secondary openings (not shown). Thus, the water pathway is defined between the skirt 214 and the wall 14 in proximity to the first end of the holder 12, through the primary apertures 32 and into the bottom of the package of tablets.

While a presently preferred and a number of alternative embodiments of the present invention have been described in detail above, it should be understood that various other adaptations and/or modifications of the dispenser may be envisioned by those persons who are skilled in the relevant art without departing from either the spirit of the invention or the scope of the appended claims.

I claim:

1. A dispenser for dispensing a water treatment substance into water, which dispenser comprises a holder for holding a supply of solid water dispersable water treatment substance, the holder comprising a cylindrical holder wall having first and second ends, with the first and second ends being closed and with at least one primary water opening being provided in the holder wall in proximity to its first end so that untreated water can enter the holder through the primary water opening and treated water, containing water treatment substance dispersed therein, can exit the holder or be dispensed from the holder through the primary water opening, and with no further aperture being provided in the holder between the primary opening and the second end of the holder;

a component rotatably attached to the holder and having a secondary opening which is located about the same distance from the first end of the holder as the primary opening and through which untreated and treated water can pass, with an enclosed water flow path being defined between the primary and secondary openings and the length of the water flow path being adjustable due to the rotatability of the component relative to the holder; and buoyancy means, for imparting buoyancy to the dispenser, in or around the holder.

2. A dispenser according to claim 1 wherein the component comprises an end cap over the first end of the holder wall, the end cap comprising a circular end piece and a skirt protruding from the end piece, with the secondary opening being provided in the skirt and the end cap thus being rotatable relative to the holder wall.

3. A dispenser, according to claim 2, wherein a pair of the secondary openings, spaced diametrically apart, are provided in the skirt, while a pair of the primary openings, also spaced diametrically apart, are provided in the holder wall.

4. A dispenser, according to claim 3, which includes a second skirt between the holder wall and the skirt of the end cap such that it is spaced from the holder wall as well as from the skirt of the end cap, with a pair of diametrically opposed tertiary water openings being provided in the second skirt and with the second skirt being fixed in position relative to the holder wall such that the tertiary openings are staggered relative to the primary openings.

5. A dispenser, according to claim 2, which includes a second skirt around the skirt of the end cap such that it is spaced from the skirt of the end cap, with a pair of diametrically opposed tertiary water openings being provided in the second skirt and with the second skirt being fixed in position relative to the holder wall.

6. A dispenser, according to claim 1, which includes a supply of the water treatment substance inside the holder, with the substance being in the form of a plurality of tablets stacked one on top of the other in the holder.

7. A dispenser, according to claim 1, wherein the open area of each opening is at least 50 mm$^2$.

8. A dispenser according to claim 1, wherein the buoyancy means comprises a buoyancy chamber around the holder.

9. A dispenser for dispensing a water treatment substance into water, which dispenser comprises a holder for holding a supply of solid water dispersable water treatment substance, the holder comprising a cylindrical holder wall having first and second ends, with at least the first end being closed and with at least one primary water opening being provided in the holder wall in proximity to its first end so that untreated water can enter the holder through the primary water opening and treated water, containing water treatment substance dispersed therein, can exit the holder or be dispensed from the holder through the primary water opening;

an end cap over the first end of the holder wall, the end comprising a circular end piece and a skirt protruding from the end piece, with a secondary opening being provided in the skirt, the secondary opening being spaced from the primary opening and through which untreated and treated water can pass, with an enclosed water flow path being defined between the primary and secondary openings, and with the length of the water flow path being adjustable; and a second skirt between the holder wall and the skirt of the end cap such that it is spaced from the holder wall as well as from the skirt of the end cap, with a tertiary water opening being provided in the second skirt and with the second skirt being fixed in position relative to the holder wall such that the tertiary opening is staggered relative to the primary opening.

10. A dispenser according to claim 9, wherein the end cap is rotatable relative to the holder wall, thereby to adjust the length of the water flow path, and wherein a pair of the secondary openings, spaced diametrically apart, are provided in the skirt, while a pair of the primary openings, also spaced diametrically apart, are provided in the holder wall and a pair of the tertiary openings, also spaced diametrically apart, are provided in the second skirt.

11. A dispenser for dispensing a water treatment substance into water, which dispenser comprise a holder for holding a supply of solid water dispersable water treatment substance, the holder comprising a cylindrical holder wall having first and second ends, with at least the first end being closed and with at least one primary water opening being provided in the holder wall in proximity to its first end so that untreated water can enter the holder through the primary water opening and treated water, containing water treatment substance dispersed therein, can exit the holder or be dispensed from the holder through the primary water opening;

an end cap over the first end of the holder wall, the end comprising a circular end piece and a skirt protruding from the end piece, with a secondary opening being provided in the skirt, the secondary opening being spaced from the primary opening and through which untreated and treated water can pass, with an enclosed water flow path being defined between the primary and secondary openings, and with the length of the water flow path being adjustable; and a second skirt around the skirt of the end cap such that it is spaced from the skirt of the end cap, with a tertiary water opening being provided in the second skirt and with the second skirt being fixed in position relative to the holder wall.

12. A dispenser according to claim 11, wherein the end cap is rotatable relative to the holder wall, thereby to adjust the length of the water flow path, and wherein a pair of the secondary openings, spaced diametrically apart, are provided in the skirt, while a pair of the primary openings, also spaced diametrically apart, are provided in the holder wall and a pair of the tertiary openings, also spaced diametrically apart, are provided in the second skirt.

* * * * *